United States Patent [19]

Yamamoto et al.

[11] Patent Number: 5,206,926
[45] Date of Patent: Apr. 27, 1993

[54] PLASTIC OPTICAL FIBER CORDS

[75] Inventors: Takashi Yamamoto; Katsuhiko Shimada; Hiroaki Oonishi, all of Otake, Japan

[73] Assignee: Mitsubishi Rayon Co., Ltd., Tokyo, Japan

[21] Appl. No.: 826,464

[22] Filed: Jan. 27, 1992

[30] Foreign Application Priority Data

Feb. 4, 1991 [JP] Japan .................... 3-033468

[51] Int. Cl.$^5$ ............................ G02B 6/22; G02B 6/00
[52] U.S. Cl. ..................... 385/143; 385/142; 385/141; 385/102; 385/128
[58] Field of Search ............... 385/100, 102, 109, 126, 385/128, 142, 143, 144, 145, 147; 526/243, 245, 247; 174/99 R, 110 R, 110 SR, 110 FC

[56] References Cited

U.S. PATENT DOCUMENTS

| 4,530,569 | 7/1985 | Squire .................................. 385/145 |
| 4,544,235 | 10/1985 | Nishida et al. ...................... 385/145 |
| 4,881,794 | 11/1989 | Bartoszek ............................ 385/102 |
| 4,941,729 | 7/1990 | Hardin et al. ....................... 385/107 |
| 4,969,706 | 11/1990 | Hardin et al. ....................... 385/100 |
| 5,024,506 | 6/1991 | Hardin et al. ....................... 385/102 |
| 5,074,640 | 12/1991 | Hardin et al. ....................... 385/109 |
| 5,111,526 | 5/1992 | Yamamoto et al. ................ 385/145 |
| 5,113,477 | 5/1992 | Eguchi et al. ....................... 385/143 |
| 5,155,796 | 10/1992 | Oonishi et al. ..................... 385/143 |

FOREIGN PATENT DOCUMENTS

| 0226116 | 6/1987 | European Pat. Off. ........ 385/143 X |
| 0418094A2 | 3/1991 | European Pat. Off. ........ 385/100 X |
| 0438170A2 | 7/1991 | European Pat. Off. ........ 385/143 X |
| WO89/12240 | 12/1989 | PCT Int'l Appl. .............. 385/145 X |

OTHER PUBLICATIONS

Office of Japanese Industrial Standards, "Testing Method for Flammibility of Polymeric Materials Using the Oxygen Index Method," JIS 7201, 1976.

Primary Examiner—Brian Healy
Attorney, Agent, or Firm—Finnegan, Henderson, Farabow, Garrett & Dunner

[57] ABSTRACT

A flame retardant plastic optical fiber cord comprising a plastic optical fiber comprising a core and a cladding, and a jacket layer provided on the optical fiber, wherein the jacket layer has an oxygen index of not less than 25 as measured by the method stated in JAPANESE INDUSTRIAL STANDARD K 7201.

2 Claims, 6 Drawing Sheets

| OXYGEN CON-CENTRATION (%) | OXYGEN FLOW RATE (l/MIN) | NITROGEN FLOW RATE (l/MIN) | OXYGEN CON-CENTRATION (%) | OXYGEN FLOW RATE (l/MIN) | NITROGEN FLOW RATE (l/MIN) | OXYGEN CON-CENTRATION (%) | OXYGEN FLOW RATE (l/MIN) | NITROGEN FLOW RATE (l/MIN) |
|---|---|---|---|---|---|---|---|---|
| 5.3 | 0.60 | 10.80 | 21.1 | 2.40 | 9.00 | 36.8 | 4.20 | 7.20 |
| 5.7 | 0.65 | 10.75 | 21.5 | 2.45 | 8.95 | 37.3 | 4.25 | 7.15 |
| 6.1 | 0.70 | 10.70 | 21.9 | 2.50 | 8.90 | 37.7 | 4.30 | 7.10 |
| 6.6 | 0.75 | 10.65 | 22.4 | 2.55 | 8.85 | 38.2 | 4.35 | 7.05 |
| 7.0 | 0.80 | 10.60 | 22.8 | 2.60 | 8.80 | 38.6 | 4.40 | 7.00 |
| 7.5 | 0.85 | 10.55 | 23.2 | 2.65 | 8.75 | 39.0 | 4.45 | 6.95 |
| 7.9 | 0.90 | 10.50 | 23.7 | 2.70 | 8.70 | 39.5 | 4.50 | 6.90 |
| 8.3 | 0.95 | 10.45 | 24.1 | 2.75 | 8.65 | 39.9 | 4.55 | 6.85 |
| 8.8 | 1.00 | 10.40 | 24.6 | 2.80 | 8.60 | 40.4 | 4.60 | 6.80 |
| 9.2 | 1.05 | 10.35 | 25.0 | 2.85 | 8.55 | 40.8 | 4.65 | 6.75 |
| 9.6 | 1.10 | 10.30 | 25.4 | 2.90 | 8.50 | 41.2 | 4.70 | 6.70 |
| 10.1 | 1.15 | 10.25 | 25.9 | 2.95 | 8.45 | 41.7 | 4.75 | 6.65 |
| 10.5 | 1.20 | 10.20 | 26.3 | 3.00 | 8.40 | 42.1 | 4.80 | 6.60 |
| 11.0 | 1.25 | 10.15 | 26.8 | 3.05 | 8.35 | 42.5 | 4.85 | 6.55 |
| 11.4 | 1.30 | 10.10 | 27.2 | 3.10 | 8.30 | 43.0 | 4.90 | 6.50 |
| 11.8 | 1.35 | 10.05 | 27.6 | 3.15 | 8.25 | 43.4 | 4.95 | 6.45 |
| 12.3 | 1.40 | 10.00 | 28.1 | 3.20 | 8.20 | 43.9 | 5.00 | 6.40 |
| 12.7 | 1.45 | 9.95 | 28.5 | 3.25 | 8.15 | 44.3 | 5.05 | 6.35 |
| 13.2 | 1.50 | 9.90 | 28.9 | 3.30 | 8.10 | 44.7 | 5.10 | 6.30 |
| 13.6 | 1.55 | 9.85 | 29.4 | 3.35 | 8.05 | 45.2 | 5.15 | 6.25 |
| 14.0 | 1.60 | 9.80 | 29.8 | 3.40 | 8.00 | 45.6 | 5.20 | 6.20 |
| 14.5 | 1.65 | 9.75 | 30.3 | 3.45 | 7.95 | 46.1 | 5.25 | 6.15 |
| 14.9 | 1.70 | 9.70 | 30.7 | 3.50 | 7.90 | 46.5 | 5.30 | 6.10 |
| 15.4 | 1.75 | 9.65 | 31.1 | 3.55 | 7.85 | 46.9 | 5.35 | 6.05 |
| 15.8 | 1.80 | 9.60 | 31.6 | 3.60 | 7.80 | 47.4 | 5.40 | 6.00 |
| 16.2 | 1.85 | 9.55 | 32.0 | 3.65 | 7.75 | 47.8 | 5.45 | 5.95 |
| 16.7 | 1.90 | 9.50 | 32.5 | 3.70 | 7.70 | 48.2 | 5.50 | 5.90 |
| 17.1 | 1.95 | 9.45 | 32.9 | 3.75 | 7.65 | 48.7 | 5.55 | 5.85 |
| 17.5 | 2.00 | 9.40 | 33.3 | 3.80 | 7.60 | 49.1 | 5.60 | 5.80 |
| 18.0 | 2.05 | 9.35 | 33.8 | 3.85 | 7.55 | 49.6 | 5.65 | 5.75 |
| 18.4 | 2.10 | 9.30 | 34.2 | 3.90 | 7.50 | 50.0 | 5.70 | 5.70 |
| 18.9 | 2.15 | 9.25 | 34.6 | 3.95 | 7.45 | 50.4 | 5.75 | 5.65 |
| 19.3 | 2.20 | 9.20 | 35.1 | 4.00 | 7.40 | 50.9 | 5.80 | 5.60 |
| 19.7 | 2.25 | 9.15 | 35.5 | 4.05 | 7.35 | 51.3 | 5.85 | 5.55 |
| 20.2 | 2.30 | 9.10 | 36.0 | 4.10 | 7.30 | 51.8 | 5.90 | 5.50 |
| 20.6 | 2.35 | 9.05 | 36.4 | 4.15 | 7.25 | 52.2 | 5.95 | 5.45 |

FIG.5(a)

| OXYGEN CONCENTRATION (%) | OXYGEN FLOW RATE (l/MIN) | NITROGEN FLOW RATE (l/MIN) | OXYGEN CONCENTRATION (%) | OXYGEN FLOW RATE (l/MIN) | NITROGEN FLOW RATE (l/MIN) | OXYGEN CONCENTRATION (%) | OXYGEN FLOW RATE (l/MIN) | NITROGEN FLOW RATE (l/MIN) |
|---|---|---|---|---|---|---|---|---|
| 52.6 | 6.00 | 5.40 | 60.5 | 6.90 | 4.50 | 68.4 | 7.80 | 3.60 |
| 53.1 | 6.05 | 5.35 | 61.0 | 6.95 | 4.45 | 68.9 | 7.85 | 3.55 |
| 53.5 | 6.10 | 5.30 | 61.4 | 7.00 | 4.40 | 69.3 | 7.90 | 3.50 |
| 53.9 | 6.15 | 5.25 | 61.8 | 7.05 | 4.35 | 69.7 | 7.95 | 3.45 |
| 54.4 | 6.20 | 5.20 | 62.3 | 7.10 | 4.30 | 70.2 | 8.00 | 3.40 |
| 54.8 | 6.25 | 5.15 | 62.7 | 7.15 | 4.25 | 70.6 | 8.05 | 3.35 |
| 55.3 | 6.30 | 5.10 | 63.2 | 7.20 | 4.20 | 71.1 | 8.10 | 3.30 |
| 55.7 | 6.35 | 5.05 | 63.6 | 7.25 | 4.15 | 71.5 | 8.15 | 3.25 |
| 56.1 | 6.40 | 5.00 | 64.0 | 7.30 | 4.10 | 71.9 | 8.20 | 3.20 |
| 56.6 | 6.45 | 4.95 | 64.5 | 7.35 | 4.05 | 72.4 | 8.25 | 3.15 |
| 57.0 | 6.50 | 4.90 | 64.9 | 7.40 | 4.00 | 72.8 | 8.30 | 3.10 |
| 57.5 | 6.55 | 4.85 | 65.4 | 7.45 | 3.95 | 73.2 | 8.35 | 3.05 |
| 57.9 | 6.60 | 4.80 | 65.8 | 7.50 | 3.90 | 73.7 | 8.40 | 3.00 |
| 58.3 | 6.65 | 4.75 | 66.2 | 7.55 | 3.85 | 74.1 | 8.45 | 2.95 |
| 58.8 | 6.70 | 4.70 | 66.7 | 7.60 | 3.80 | 74.6 | 8.50 | 2.90 |
| 59.2 | 6.75 | 4.65 | 67.1 | 7.65 | 3.75 | 75.0 | 8.55 | 2.85 |
| 59.6 | 6.80 | 4.60 | 67.5 | 7.70 | 3.70 | 75.4 | 8.60 | 2.80 |
| 60.1 | 6.85 | 4.55 | 68.0 | 7.75 | 3.65 | | | |

FIG.5(b)

| METHOD OF SUPPORTING TEST PIECE | | SHAPE AND DIMENSIONS OF TEST PIECE | APPLICATION |
|---|---|---|---|
| CATEGORY | CATEGORY SYMBOL | | |
| TESTING WITH TEST PIECE IN SELF-SUPPORTING FORM | NO. A-1 | LENGTH: 70 TO 150 mm<br>WIDTH: 6.5 ± 0.5 mm<br>* THICKNESS: 3.0 ± 0.5 mm | |
| | NO. A-2 | * LENGTH: 150 mm<br>* WIDTH: 20 mm<br>THICKNESS: SAME AS THE THICKNESS OF SPECIMEN AS IT STANDS | IN THE CASE WHERE THIN MATERIALS, THERMALLY MELTING CLOTHS, OR THE LIKE ARE TESTED IN ROLLED FORM. |
| TESTING WITH TEST PIECE ATTACHED TO A U-SHAPED HOLDER | NO. B-1 | LENGTH: 150 mm<br>WIDTH: 60 mm<br>THICKNESS: SAME AS THE THICKNESS OF SPECIMEN AS IT STANDS | |
| | NO. B-2 | | IN THE CASE WHERE THERMALLY MELTING CLOTHS OR THE LIKE ARE TESTED BY SEWING GLASS FIBRE ON THE TEST PIECE. |

NOTE * THESE DIMENSIONS ARE GIVEN AS A RULE.

PLASTIC OPTICAL FIBER CORDS

BACKGROUND OF THE INVENTION

1. Field of the Invention

The present invention relates to an optical fiber cord comprising a plastic optical fiber comprising a core and a cladding, and a jacket layer provided on the optical fiber, and, more particularly, to a plastic optical fiber cord with excellent flame retardance.

2. Description of the Related Art

Inorganic glass optical fibers have been known as optical fibers which are excellent in light transmission properties over a broad range of wavelengths. However, since said glass optical fibers do not have good processability or flexural strength, plastic optical fibers were developed and have been widely used as optical fibers.

These plastic optical fibers are basically comprised of a core polymer comprising a polymer which has excellent light transmission properties and a high refractive index, such as polymethyl methacrylate (hereinafter referred to as PMMA), polycarbonate (hereinafter referred to as PC), and a clad polymer comprising a transparent polymer which has a refractive index lower than that of the core polymer, such as fluorine-containing polymers.

Known examples of the plastic optical fibers of this type are optical fiber strands, bulk fibers made by covering optical fiber strands with a functional protective layer, optical fiber cords made by covering optical fiber strands with a jacket, bundled fibers made of an assembly of bulk fibers, and optical fiber cables made by applying tension members to the bulk fibers.

For the jacket material these all-plastic optical fiber cords use a vinyl chloride resin containing a plasticizer of not less than 10 wt %, or a polyethylene. Because these fiber cords have a low capacity for flame retardance, their applications are limited.

SUMMARY OF THE INVENTION

One of the objects of the present invention is to provide an all-plastic optical fiber cord having an excellent level of flame retardance.

The present invention provides an all-plastic optical fiber cord having an excellent level of flame retardance which cannot be attained by any conventional all-plastic optical fiber cord. The optical fiber cord of the present invention comprises a plastic optical fiber comprising a core and a cladding, and a jacket layer provided on the optical fiber, wherein the jacket layer has an oxygen index of not less than 25 as measured by the method of JIS K 7201.

BRIEF DESCRIPTION OF THE DRAWING

FIGS. 5a and 5b show the relationship of flow rates of oxygen and nitrogen to the concentration of oxygen.

DETAILED DESCRIPTION OF THE PREFERRED EMBODIMENTS

Heretofore developed fire retardant plastic optical fiber cords use PMMA or PC as a core forming polymer and a plasticized polyvinyl chloride resin as a flame retardant jacket material. Non-plasticized vinyl chloride resins have an excellent level of flame retardance, having an oxygen index of 42 as measured by JIS K 7201 ("Method for Testing for Flammability of Polymeric Materials Using the Oxygen Index Method"). In the present invention the oxygen index is as defined in JIS (Japanese Industrial Standard) K 7201, enacted in 1976. It denotes the maximum oxygen concentration value (in volume percentage) required for the continuous combustion of the material under specified testing conditions.

Figure 6:
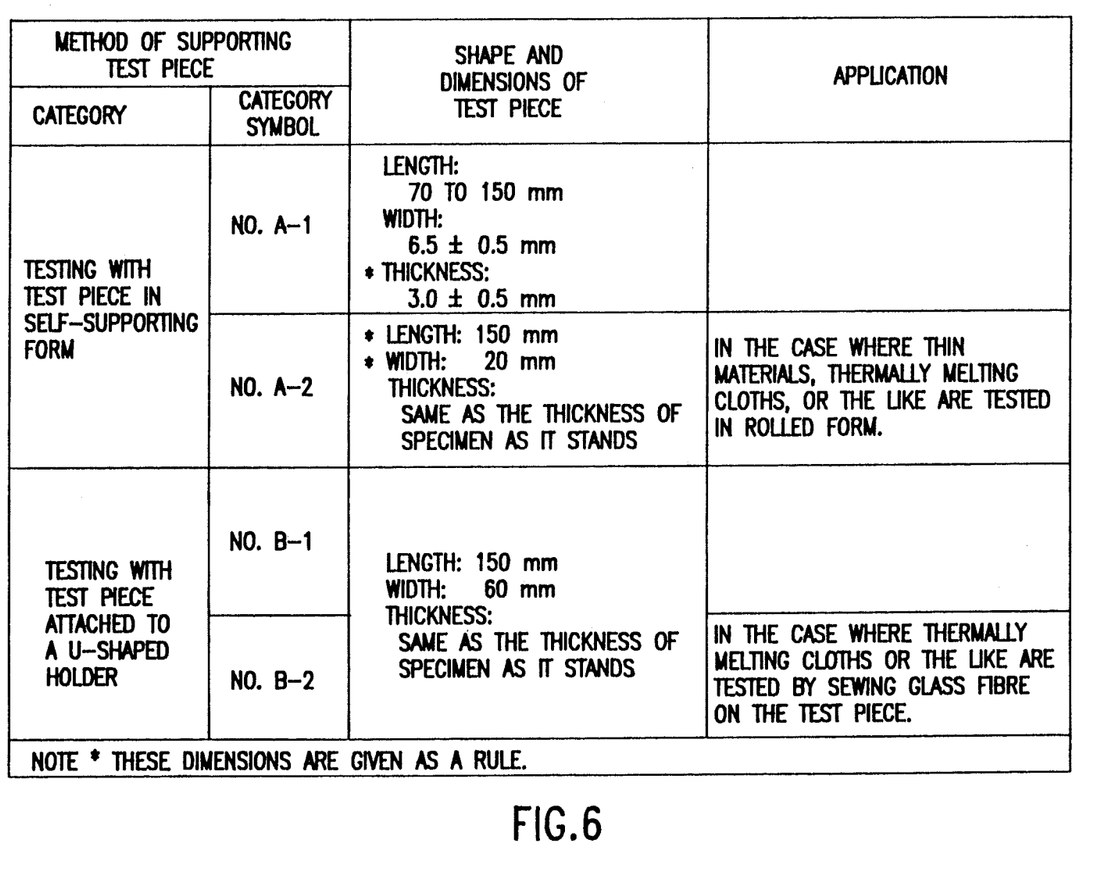
FIG. 6 shows the results of a method for supporting the test piece during processing according to the present invention.

JIS K 7201 provides an oxygen index method for testing the flamability of polymeric materials. The measuring section of the apparatus used in the oxygen index method includes an oxygen flow meter (with a minimum scale value of 0.1 l/min and equipped with a flow adjusting valve), a nitrogen flow meter (with a minimum scale value of 0.1 l/min and equipped with a flow adjusting valve), a gas mixer, a pressure gauge, a pressure regulator cleaner, and a checking valve. Each flow meter is calibrated every year. FIG. 6 shows method for supporting a test piece according to its shape and dimensions, and according to its application.

Rubber test pieces are prepared by a vulcanizing process. After a waiting period of 24 hours or longer after the vulcanization process, the rubber is conditioned to a room temperature of $20+10/0°$ C. for 1 hour or longer before the test.

For plastics including molding materials and extrusion compounds, the test pieces shall be prepared either by injection molding or compression molding, or by cutting out of shaped products in the form of plates, boards, or films. The plastics are then conditioned at a temperature of $20°\pm2°$ C. and a relative humidity of $65\pm5\%$, for 24 hours or longer before the test.

Figure 3:
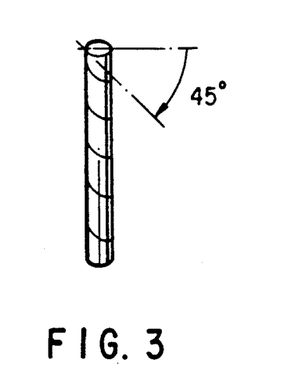
FIG. 3 shows a rolled test piece conforming to a method of the present invention.

For fiber, test pieces shall be taken from the area which is 1/10 of the total width apart from both sides and 1 mm or more apart from the ends of the sample cloth. No. A-2 Test Pieces shall be prepared, as shown in FIG. 3, by winding the cloth densely around a core of 0.8 to 0.9 mm diameter wire or the like into the form of a twisted paper string of 80 to 100 mm in length and then pulling out the core. No. B-2 Test Pieces shall be prepared, as shown in Attached FIG. 4, by sewing three glass fiber filaments, one positioned at the middle of the test piece and the remaining two 1 cm from the first filament on both sides. In this case, the number of stitches is 4 to 5/cm. The glass fiber is a long filament of 900 to 1000 D. The fiber test pieces shall be left standing in a thermostatic drier at $50°\pm2°$ C. for 24 hours. However, test pieces which are not influenced by heat may instead by conditioned by leaving them standing in a thermostatic drier at $105°\pm2°$ C. for 1 hour. Then, the pieces are left in a silica gel desiccator for 2 hours or longer.

The test should be carried out in a testing room at a temperature of 20°±5° C., and relative humidity of 65±20%.

Figure 1:
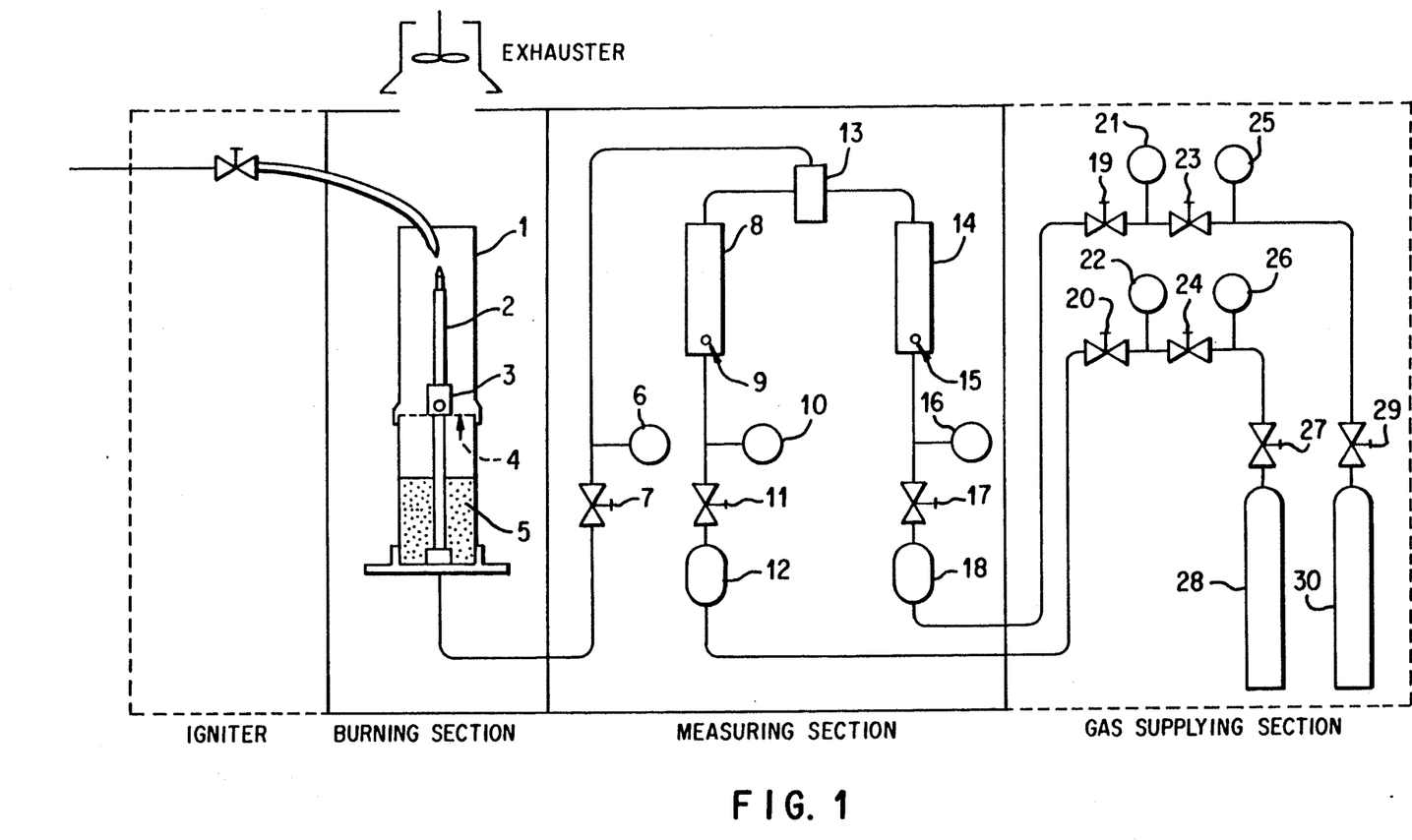
FIG. 1 shows the test apparatus used in a method of the present invention.
Figure 2:
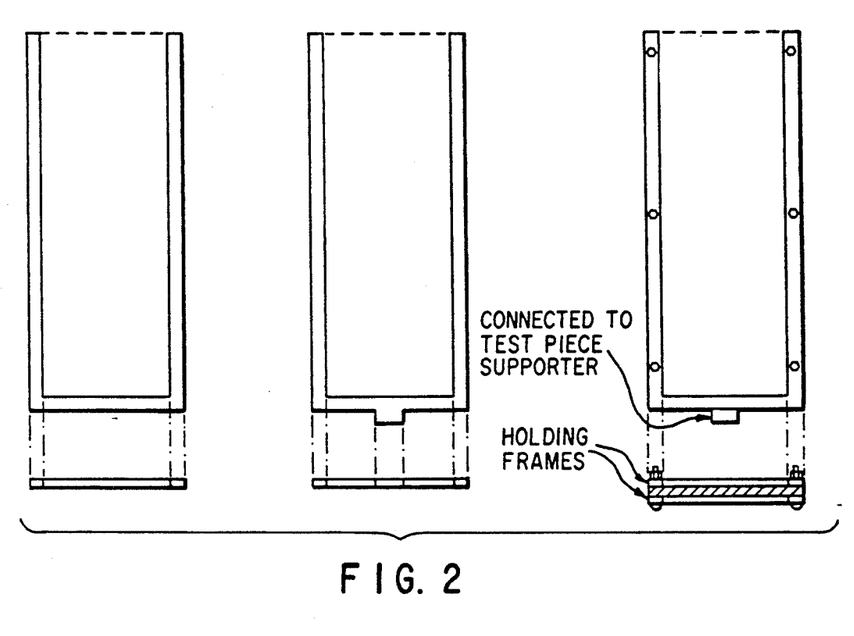
FIG. 2 shows a U-shaped holder for holding the test piece during the process used in he present invention.

The test apparatus itself is shown in FIG. 1. The method of holding the test piece is shown in FIG. 2.

Figure 4:
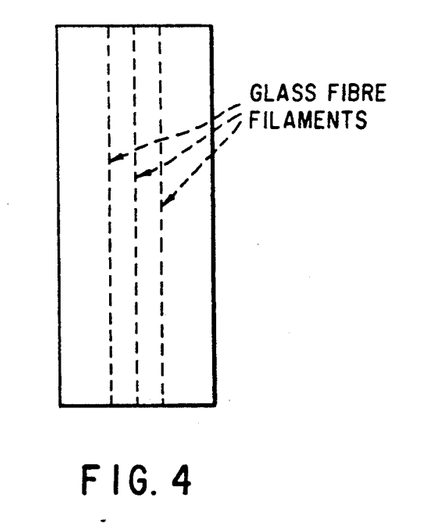
FIG. 4 shows a test piece conforming to a method of the present invention.

Rolled test pieces conforming to methods A-2 and B-2 are shown in FIGS. 3 and 4 respectivley.

The following paragraphs describe the test procedure and calculations used in the oxygen index method.

1. Test Procedure a) The test piece shall be attached to the test piece supporter by the methods described below.

(1) No. A-1 or No. A-2 Test Piece shall be attached to the test piece supporter vertically so that its upper end is positioned 100 mm or more distant from the upper end of the combustion cylinder.

Figure 5B:
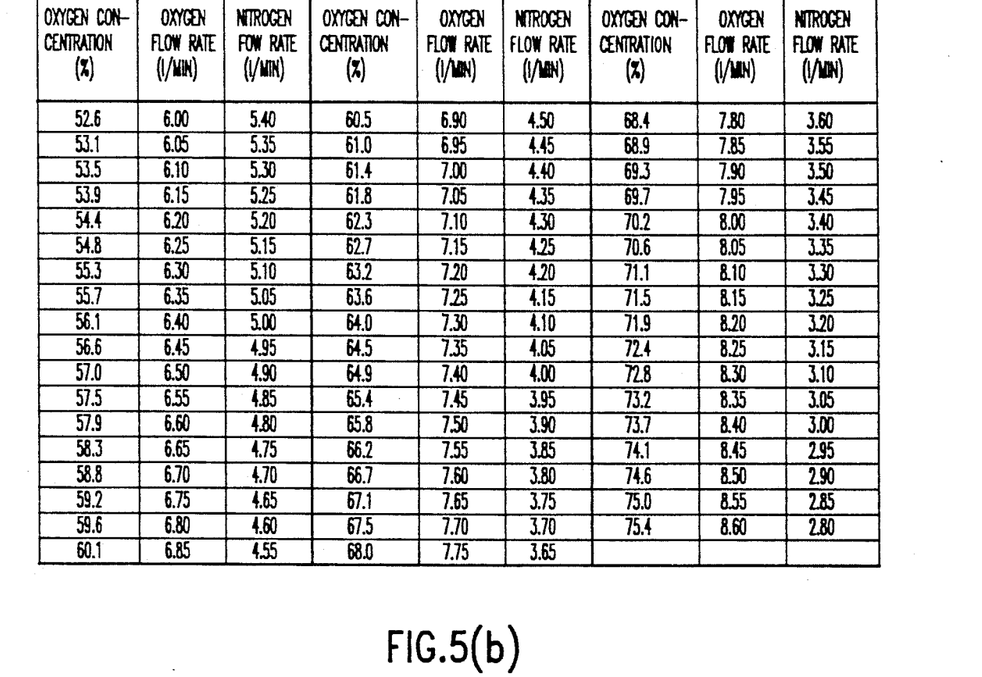

(2) No. B-1 or No. B-2 Test Piece shall be held between two holding frames of a U-shaped holder, shown in FIG. 2, and fixed with screws, clips, or the like to the upper end, centre, and lower end, or, if necessary, to several locations, and then the U-shaped holder shall be attached, with the test piece in he vertical position, to the test piece supporter so that the upper end of the test piece is positioned 100 mm or more distant from the upper end of the combustion cylinder.

b) An estimated oxygen concentration of the sample shall be selected, and the test apparatus shall be set by selecting preliminary an oxygen flow rate and nitrogen flow rate corresponding to such concentration by reference to FIG. 5. If the oxygen concentration of the sample cannot be estimated, it is recommended that the test piece is ignited to examine the combustion condition, and, if the test piece burns rapidly, the test should be started with an oxygen concentration of about 18%. If the test piece does not take fire, starting the test with an oxygen concentration of about 23% or higher is recommended. For changing the concentration, the ratio of oxygen flow to nitrogen flow shall be determined by reference to FIG. 5. However, it is necessary to confirm that the total flow rate in the combustion cylinder is 11.2 l/min and maintain a balance of such a ratio continuously.

c) the length of the flame when the head of the igniter is directed upward shall be adjusted to 15 to 20 mm.

d) After opening the oxygen and nitrogen flow adjusting valves to introduce the gases into the combustion cylinder for about 30 sec., the test piece shall be ignited at its top. After confirming that the whole of the upper part of the test piece has been ignited and that it is burning in the form of flame, the igniter flame shall be removed and promptly the measurement of the burning time and burning length shall be started.

e) the procedure (1) or (2) below shall be repeated, and the minimum oxygen flow rate and the corresponding nitrogen flow rate required for the test piece to burn continuously for 3 min or longer, or for the test piece to burn with a length of 50 mm or larger after ignition, shall be determined. However, such rate shall not be changed during burning.

(1) In the case in which the burning time of the test piece exceeds 3 min or the burning length exceeds 50 mm, since it proves that the oxygen concentration is too high, it shall be gradually lowered. (2) In the case in which the flame extinguishes immediately after ignition, or it extinguishes in a burning time of less than 3 min or with a burning length of less than 50 mm, since it proves that the oxygen concentration is too low, it shall be gradually heightened.

2. Calculation

After carrying out the test in accordance with 1.a)e), the oxygen index shall be obtained by the following formula. The test shall be performed three times, and the mean value of the results shall be obtained and rounded to one decimal place by the following rule:

$$O.I. = \frac{[O]}{[O] + [N]} \times 100$$

where
[O]: flow rate of oxygen obtained in 1.a)e) (l/min)
[N]: flow rate of nitrogen corresponding to the above (l/min).

The teaching of JIS K 7201 is hereby incorporated by reference. FIG. 1 shows a combustion cylinder 1 in which a sample 2 is positioned on a test piece supporter 3. Metal screen 4 and glass beads 5 are also contained inside the combustion cylinder 1, which is further connected to shut-off valve 7 and pressure gauge 6. Pressure gauge 6 is used for checking leakage.

FIG. 1 further shows a measuring section which includes a nitrogen flow meter 8, micro-adjusting valves 9, 15, nitrogen pressure gauge 10, and a nitrogen pressure regulator 11. The measuring section further contains gas mixer 13, oxygen flow space meter 14, oxygen pressure gauge 16, and oxygen pressure regulator 17. Cleaners 12 and 18 are further provided in the measuring section.

The gas supplying section of FIG. 1 includes valves 19, 20, 27, 29, supplying pressure gauge 21, 22, pressure regulator 23, 24, main pressure gauge 25, 26, nitrogen bomb 28, and oxygen bomb 30.

Since a polyvinyl chloride resin is rigid, a plasticizer has to be added to use it as a jacket material. If dioctyl phthalate, as a plasticizer, in an amount of 30 wt %, is added to a polyvinyl chloride resin, the oxygen index of this plasticized polyvinyl chloride resin is decreased to 24, and the flame retardance of the plastic optical fiber cord coated with this plasticized polyvinyl chloride resin is not satisfactory. Also, even after the source of a flame is removed from the cord, this type of flame retardant plastic optical fiber cord can burn for a minimum of several tens of seconds to as long as several minutes after ignition before extinguishing itself.

Since in the present invention the clad layer is surrounded by a polymer (A) having an oxygen index of not less than 25, the flame retardance of an optical fiber cord can be remarkably improved.

The polymer (A) which can be used as a jacket material in the present invention may be a single polymer, a blend of single polymers, or a mixture of a single polymer (or a blend of single polymers) and additives such as flame retardants, plasticizers, stabilizers, and lubricants.

Examples of the single polymer having an oxygen index of not less than 25 include polyvinyl chloride (oxygen index: 45), polyvinylidene chloride (oxygen index: 60), polyvinylidene fluoride (oxygen index: 44), tetrafluoroethylene (oxygen index: 95), polyamide (oxygen index: 29), and PC (oxygen index: 26). A blend of one or more of these polymers may also be used. The exemplified polymers may be a copolymer if the copolymer has an oxygen index of not less than 25. Of course, a mixture of these polymers and flame retardants may also be used.

Although a polyolefin such as polyethylene or polypropylene has an oxygen index of less than 25, it may also be used if a mixture of the polyolefin and at least one retardant selected from phosphorus flame retardants, halogen flame retardants, inorganic flame retardants, and etc. has an oxygen index of not less than 25.

If necessary, additives such as plasticizers, stabilizers, and/or lubricants may be added to the exemplified polymers.

Examples of the phosphorus flame retardants include phosphoric esters such as triphenyl phosphate and tricresyl phosphate, phosphoric esters containing halogens such as tris(chloroethyl)phosphate, polyphosphonate, phosphonate-type polyols, vinyl phosphonate, and allyl phosphonate.

Examples of the halogen containing flame retardants include bromine containing flame retardants such as hexabromobenzene, decabromo diphenyl oxide, tetrabromobisphenol A, and vinyl bromide, and chlorine containing flame retardants such as chlorinated paraffin, chlorinated polyethylene, and perchloropentacyclodecane.

Examples of the inorganic flame retardants include antimony compounds such as antimony trioxide and antimony pentoxide, metal hydroxides such as alminum hydroxide, molybdenum compounds such as molybdenum trioxide, borate, calcium compound such as calcium carbonate and calcium hydroxide, silicones, and clay.

Homopolymers or copolymers of polymethyl methacrylate or other methacrylate ester derivatives, polycarbonates obtained by using at least one of the bisphenols represented by general formulas (2) to (8), and polymers containing halogens in an amount not less than 30 wt % are highly flame-retardant, and they are the most preferable examples for the core polymers that can be used in the plastic optical fiber cord of the present invention:

(2)

(3)

(4)

(5)

(6)

(7)

(8)

Examples of these polymers are a polymer containing a monomer unit represented by the general formula (1) as the main component, or a copolymer of perfluoro(2,2-dimethyl-1,3-dioxole) and fluorinated olefins such as tetrafluoroethylene or chlorotrifluoroethylene:

(1)

(wherein X represents H, CH$_3$, D, F, CF$_3$, or Cl; Y represents H or D; and Rf represents a linear or branched fluoro alkyl group.)

In the above, "a polymer containing a monomer unit represented by the general formula (1) as the main component" means that the monomer unit is contained in the polymer in an amount of not less than 70 wt %.

Clad polymers for the plastic optical fiber cords of the present invention must have a refractive index below that of a core polymer. If a PMMA is used as the core polymer, polymers such as vinylidene fluoride copolymers, fluoroalkyl methacrylates, and fluoroalkyl acrylates or α-fluoroalkyl acrylates, are preferable. If a PC is used as the core polymer, methacrylate polymers such as PMMA can also be used.

If a polymer containing fluorine is used as the core polymer, any clad polymer material must have a very low refractive index, and α-fluorofluoroalkyl acrylate polymers or copolymers containing perfluoro(2,2-dimethyl-1,3-dioxole) in an amount of not less than 20 mole % are examples of the clad polymer materials. If the content of perfluoro(2,2-dimethyl-1,3-dioxole) in the copolymers is less than 20 mole % the Tg of the copolymers becomes not higher than 60° C., and the heat resistance becomes insufficient.

Examples of the methods for making the plastic optical fiber cords of the present invention include, but are not limited to, i) the monolithic formation of core, cladding and jacket layers by the conjugate melt spinning method, ii) the monolithic formation of an optical fiber of core and cladding by the conjugate melt spinning method, and the coating of a jacket layer onto the optical fiber by a separate process, such as the melt spinning method or the solvent coating method, or iii) the monolithic formation of an optical fiber of core, cladding and protective layers by the conjugate spinning method, and the coating of a jacket layer onto the optical fiber by the separate process.

In the examples, all monomers to be used were purified by a conventional method, and they were used immediately after distillation.

Flame Retardance Test

Figure 7:
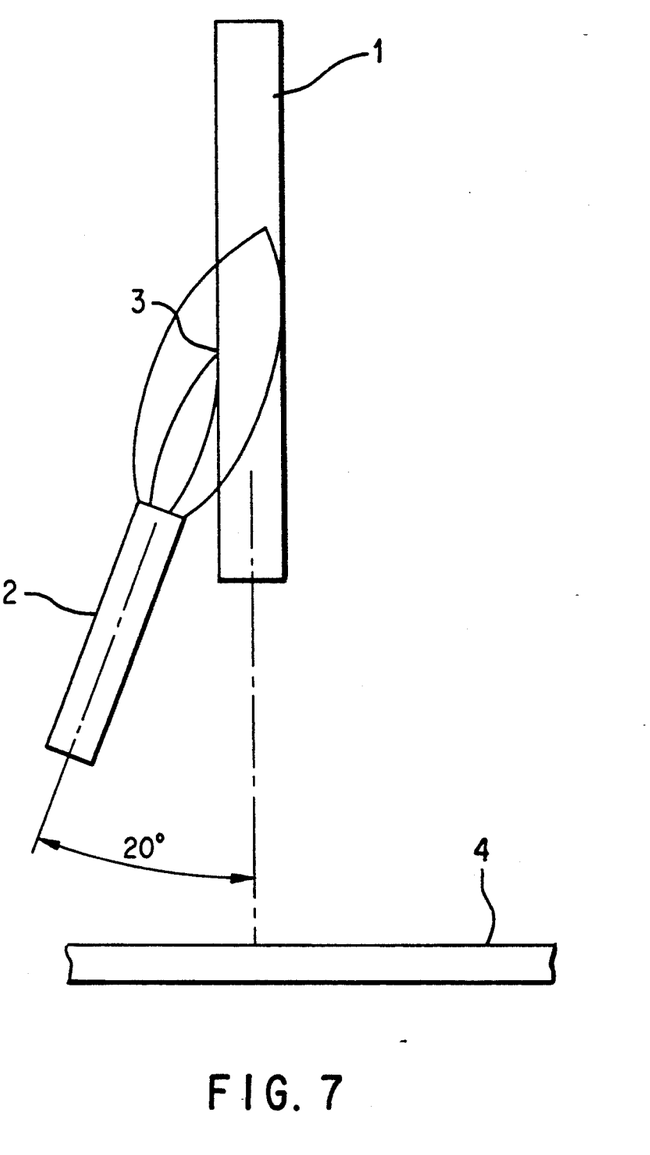
FIG. 7 is a graphic representation of a method for testing for non-flamability according to the present invention.

The flame retardance of the plastic optical fiber cord of the present invention was measured by the method stated below. As shown in FIG. 7 a plastic optical fiber cord 1 ("test piece") is supported vertically. The flame (inner flame temperature: not less than 836° C.) of a tirol gas burner 2 is kept in contact with a surface of the test piece for 15 seconds to ignite the test piece, in a manner that, as shown in Figure, the top 3 of the inner flame contacts the surface of the test piece, and then the igniter flame is extinguished. The burning time of the test piece is measured. If the burning time is not shorter than 60 seconds, the flame retardance is judged as "not good." The molten resin of the optical fiber cord is dropped onto absorbent wadding 4 located 165 mm below the bottom of the test piece. If the absorbent wadding burns, the flame retardance is judged as "not good."

[Tg]

The glass transition temperature was measured by differential scanning calorimetry (DSC).

EXAMPLE 1

A monomer mixture of methyl methacrylic acid containing 0.3 wt % of n-octylmercaptane and 20 ppm of ditertially butyl peroxide was filtered with a tetrafluoroethylene (THF) membrane filter of 0.02 μm pore size, and then polymerized for 4 hours at 180° C. under a pressure of $N^2$ gas, and a syrup having a polymerization conversion ratio of 49% was obtained. This syrup was continuously fed into a vented extruder to get a polymer containing a residual monomer of not more than 0.5%. This polymer was fed into the core polymer feeding portion in a spinning machine maintained at 210° C. The core polymer obtained had a Tg of 109° C. and a refractive index of 1.490.

A copolymer of vinylidene fluoride and tetrafluoroethylene (80 mole %/20 mole %, Refractive Index: 1.402) was melted with a melt extruder, and was fed into the clad material feeding portion in the spinning machine. The fed core and clad polymers were spun through a conjugate spinning nozzle to give an optical fiber having a core-clad structure and an outer diameter of 1 mmφ.

A jacket material having an oxygen index of 36 was obtained by blending 23 wt % of dioctyl phthalate, 2 wt % of lead stearate, 0.2 wt % of stearic acid, 20 wt % of tris(tribromophenyl)phosphite, and 4.8 wt % of antimony trioxide with 50 wt % of a vinyl chloride resin. This jacket material was melted with a melt extruder, was spun through a crosshead die to surround the outer layer of the optical fiber with a jacket layer having a thickness of 0.6mm. A plastic optical fiber cord having an outer diameter of 2.2 mmφ was thus obtained.

The transmission loss of the optical fiber cord was very small (136 dB/km at 650 nm). Five optical fiber cords were made by the same method, and the flame retardance test was conducted on these cords. The burning times of these test pieces were all 0 seconds. The melt resin from the bottom o( the fiber cord, produced by contacting an igniter flame to the bottom of the fiber cord, was dropped onto absorbent wadding, but the wadding was not ignited.

COMPARATIVE EXAMPLE 1

An optical fiber having an outer diameter of 2.2 mmφ was obtained by the same method as that used in Example 1, except that the jacket material used was a blend of 67 wt % of polyvinyl chloride resin (mean degree of polymerization: 1450), 30 wt % of dioctyl phthalate, 2.5 wt % of lead stearate, and 0.2 wt % of stearic acid, which has an oxygen index of 22.

The transmission loss of the thus-obtained optical fiber cord was very small (134 dB/km at 650 nm). Five optical fiber cords were made by the method mentioned above, and the flame retardance test was conducted on these cords. Among the five cords, four fiber cords burned longer than 60 seconds, and the flame retardance was not good.

EXAMPLE 2

A monomer mixture of α-fluoro-1,1,1,3,3,3-hexafluoroisopropyl acrylate containing 0.3 wt % of n-octylmercaptane and 18 ppm of ditertiallybutyl peroxide was filtered with a THF membrane filter of 0.02 μm pore size, and then polymerized for 3 hours at 150° C. under a pressure of $N^2$ gas, and a syrup having a polymerization conversion ratio of 54% was obtained. This syrup was continuously fed into a vented extruder to get a polymer containing a residual monomer of not more than 0.5%. This polymer was fed into the core polymer feeding portion in a spinning machine maintained at 180° C. The core polymer obtained had a Tg of 103° C. and a refractive index of 1.356.

A copolymer of perfluoro(2,2-dimethyl-1,3-dioxole) and tetrafluoroethylene (50 mole %/ 50 mole %, Refractive Index: 1.308) was melted with a melt extruder, and was fed into the clad material feeding portion by the spinning method. The fed core and clad polymers were spun through a conjugate spinning nozzle to give an optical fiber having a core-clad structure and an outer diameter of 1 mmφ.

A jacket material having an oxygen index of 36 was made of a blend of 50 wt % of polyvinyl chloride resin (mean degree of polymerization: 1450), 23 wt % of dioctylphthalate, 2 wt % of lead stearate, 0.2 wt % of stearic acid, 20 wt % of tris(tribromophenyl)phosphite, and 4.8 wt % of antimony trioxide. This jacket material was melted with a melt extruder maintained at 180° C., and was spun through a crosshead die to surround the outer layer of the optical fiber with a jacket layer having a thickness of 0.6 mm. A plastic optical fiber cord having an outer diameter of 2.2 mmφ was thus obtained.

The transmission loss was very small (81 dB/km at 650 nm; 110 dB/km at 770 nm). Five optical fiber cords were prepared by the above method, and the flame retardance tests were conducted on these cords. The burning times of these test pieces were all 0 seconds. The melt resin from the bottom of the fiber cord, produced by contacting an igniter flame with the bottom of the fiber cord, was dropped onto absorbent wadding, but the wadding was not ignited.

EXAMPLE 3

A monomer mixture of 70 mole % of trifluoroethyl methacrylate and 30 mole % of methyl methacrylate containing 0.15 wt % of n-octylmercaptane and 30 ppm of ditertiallybutyl peroxide was filtered with a THF membrane filter of 0.02 μm pore size, and then polymerized for 5 hours at 150° C. under a pressure of $N^2$ gas, and a syrup having a polymerization conversion ratio of 47% was obtained. This syrup was continuously fed into a vented extruder to get a polymer containing a residual monomer of not more than 0.5%. This polymer was fed into the core polymer feeding portion in a spinning machine maintained at 210° C. The core polymer obtained had a Tg of 96° C. (measured by DSC) and a refractive index of 1.424.

A copolymer of perfluoro(2,2-dimethyl-1,3-dioxole) and tetrafluoroethylene (50 mole %/ 50 mole %, Refractive Index: 1.308) was melted with a melt extruder, and was fed into the clad material feeding portion in the spinning machine. And a copolymer of vinylidene fluoride and tetrafluoroethylene (50 mole %/ 50 mole %) was melted with a melt extruder, and was fed into the protective layer feeding portion in the spinning machine. The fed core and clad polymers were spun through a conjugate spinning nozzle to give an optical fiber having a core-clad-protective layer structure and an outer diameter of 1 mm$\phi$.

A jacket material having an oxygen index of 28 was obtained by blending 59 wt % of polyethylene of a density of 0.930, 28 wt % of hexabromobiphenyl ether, and 13 wt % of antimony trioxide. This jacket material was melted with a melt extruder maintained at 150° C., and was spun through a crosshead die to surround the outer layer of the optical fiber with a jacket layer having a thickness of 0.6 mm. A plastic optical fiber cord having an outer diameter of 2.2 mm$\phi$ was thus obtained.

The transmission loss was very small (103 dB/km at 650 nm; 380 dB/km at 770 nm). The flame retardance tests were then conducted. The burning times of these test pieces were all 0 seconds. The absorbent wadding was not ignited, and the flame retardance was good.

EXAMPLE 4–8, COMPARATIVE EXAMPLES 2 AND 3

Plastic optical fiber having an outer diameter of 1 mm$\phi$ were prepared by using the same method as that described in Example 2, and a core, a cladding, and a protective layer as those described in Table 1. Jacket materials as shown in Table 1 were coated on the optical fibers, and optical fiber cords having an outer diameter of 2.2 mm$\phi$ were obtained. The results are shown in Table 1.

TABLE 1

| | Core Forming Polymer (Core Diameter 960 μm) (Refractive Index) | | Clad Forming Polymer (Clad Thickness 10 μm) (Refractive Index) | | Protective Layer Forming Polymer (Protective Layer Thickness 10 μm) | | Jacket Layer Material (Jacket Layer Thickness 600 μm) (Oxygen Index) | Light Transmission Loss (dB/Km) | | Flame Retardance Test ① Burning Time ② Burning of Absorbent Wadding | |
|---|---|---|---|---|---|---|---|---|---|---|---|
| | | | | | | | | 650 nm | 770 nm | ① | ② |
| Ex. 4 | copolymer of α-fluoro-2,2,2-trifluoroethyl acrylate and α-fluoromethyl acrylate (1.403) | 80 mole % 20 mole % | copolymer of perfluoro(2,2-dimethyl-1,3-dioxole) and tetrafluoroethylene (1.308) | 50 mole % 50 mole % | polycarbonate (Mw 14,000) | | polyvinyl chloride 50 wt % dioctyl phthalate 23 stearic acid 0.2 lead stearate 2 TBPP 20 Sb₂O₃ 4.8 (36) | 92 | 114 | 0 | not observed |
| Ex. 5 | copolymer of α-fluoro-2,2,2-trifluoroethyl acrylate and α-fluoromethyl acrylate (1.403) | 80 mole % 20 mole % | copolymer of perfluoro(2,2-dimethyl-1,3-dioxole) and tetrafluoroethylene (1.308) | 50 mole % 50 mole % | copolymer of vinylidene chloride and methyl acrylate and acrylic acid | 70 wt % 28 wt % 2 wt % | polyvinyl chloride 50 wt % dioctyl phthalate 23 stearic acid 0.2 lead stearate 2 TBPP 20 Sb₂O₃ 4.8 (36) | 90 | 111 | 0 | not observed |
| Ex. 6 | copolymer of α-fluoro-2,2,2-trifluoroethyl acrylate and α-fluoromethyl acrylate (1.403) | 70 mole % 30 mole % | [copolymer of perfluoro(2,2-dimethyl-1,3-dioxole) and tetrafluoroethylene 50 mole %] Demnum S-200 (1.310) | 90 wt % 10 wt % | copolymer of vinylidene fluoride and chlorotrifluoroethylene | 70 mole % 30 mole % | PE 60 wt % Al(OH)₃ 30 silicone elastomer 5 barium stearate 5 (26) | 110 | 144 | 0 | not observed |
| Ex. 7 | copolymer of α-fluoro-2,2,3,3,3-pentafluoropropyl acrylate (1.385) | | copolymer of perfluoro(2,2-dimethyl-1,3-dioxole) and tetrafluoroethylene (1.308) | 50 mole % 50 mole % | polycarbonate (Mw 14,000) | | polyvinyl chloride 75 wt % dioctyl phthalate 22 stearic acid 0.2 lead stearate 2.8 (25) | 93 | 115 | 20 sec. | not observed |
| Com. Ex. 2 | copolymer of α-fluoro-2,2,2-trifluoroethyl acrylate and α-fluoromethyl acrylate (1.403) | 80 mole % 20 mole % | copolymer of perfluoro(2,2-dimethyl-1,3-dioxole) and tetrafluoroethylene (1.308) | 50 mole % 50 mole % | polycarbonate (Mw 14,000) | | polyvinyl chloride 70 wt % dioctyl phthalate 27 stearic acid 0.2 lead stearate 2.8 (21) | 93 | 115 | 40 sec. | observed |
| Ex. 8 | copolymer of α-fluoro-2,2,2-trifluoroethyl acrylate and α-fluoromethyl acrylate (1.403) | 80 mole % 20 mole % | copolymer of perfluoro(2,2-dimethyl-1,3-dioxole) and tetrafluoroethylene (1.308) | 50 mole % 50 mole % | polymethyl methacrylate (Mw 100,000) | | polyvinyl chloride 50 wt % dioctyl phthalate 23 stearic acid 0.2 lead stearate 2 TBPP 20 Sb₂O₃ 4.8 (36) | 90 | 117 | 0 | not observed |
| Com. Ex. 3 | copolymer of α-fluoro-2,2,2-trifluoroethyl acrylate and α-fluoromethyl acrylate (1.403) | 80 mole % 20 mole % | copolymer of perfluoro(2,2-dimethyl-1,3-dioxole) and tetrafluoroethylene (1.308) | 50 mole % 50 mole % | polycarbonate (Mw 14,000) | | polyethylene (17) | 90 | 115 | >60 sec. | observed |

Demnum S-200: F$-(CF_2CF_2CF_2O)_n-CF_2CF_3$ (Daikin Kogyo Co., Ltd.)
TBPP: tris(tribromophenyl)phosphate

What is claimed is:

1. A plastic optical fiber cord comprising a plastic optical fiber including a core and a cladding, and a jacket layer provided on the optical fiber, wherein the jacket layer has an oxygen index of not less than 25 as measured by the formula, oxygen flow rate divided by the sum of the nitrogen flow rate and the oxygen flow rate, multiplied by one hundred; and wherein the core is composed of a polymer containing a monomer represented by the following general formula as the main component:

(wherein X represents H, $CH_3$, D, F, $CF_3$ or Cl; Y represents H or D; and Rf represents a linear or branched fluoro alkyl group.)

2. The plastic optical fiber cord as defined in claim 1, wherein the cladding is composed of a polymer containing perfluoro(2,2-dimethyl-1,3-dioxole) in an amount of not less than 20 mole %.

* * * * *